(12) United States Patent
Mitsugi et al.

(10) Patent No.: US 11,003,145 B2
(45) Date of Patent: May 11, 2021

(54) INFORMATION DISPLAY DEVICE WITH IMPROVED RELIABILITY AGAINST EXTERNAL FORCE

(71) Applicant: SONY CORPORATION, Tokyo (JP)

(72) Inventors: Masakazu Mitsugi, Kanagawa (JP); Kenji Itoh, Tokyo (JP); Seigo Yoneda, Chiba (JP); Masatomo Shimoyama, Achi (JP); Masaki Miyamoto, Tokyo (JP); Tomokazu Takase, Saitama (JP); Yoichi Ito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/494,985

(22) PCT Filed: Apr. 6, 2018

(86) PCT No.: PCT/JP2018/014733
§ 371 (c)(1),
(2) Date: Sep. 17, 2019

(87) PCT Pub. No.: WO2018/193879
PCT Pub. Date: Oct. 25, 2018

(65) Prior Publication Data
US 2020/0285201 A1    Sep. 10, 2020

(30) Foreign Application Priority Data
Apr. 21, 2017 (JP) .............................. JP2017-084576

(51) Int. Cl.
*G04G 9/00*     (2006.01)
*G04G 17/08*   (2006.01)
(Continued)

(52) U.S. Cl.
CPC .......... *G04G 9/0035* (2013.01); *G04G 17/08* (2013.01); *G04G 21/02* (2013.01); *G06F 3/14* (2013.01)

(58) Field of Classification Search
CPC ...... G04G 9/0035; G04G 17/08; G04G 21/02; G06F 3/14
See application file for complete search history.

(56) References Cited

U.S. PATENT DOCUMENTS

2009/0251888 A1* 10/2009 Douglas ............... A44C 5/0015
                                                         362/103
2011/0244243 A1* 10/2011 Uemura ................. B32B 27/12
                                                         428/412
(Continued)

FOREIGN PATENT DOCUMENTS

CN         1747668 A      3/2006
CN       104767844 A      7/2015
(Continued)

*Primary Examiner* — Liliana Cerullo
(74) *Attorney, Agent, or Firm* — Paratus Law Group, PLLC

(57) ABSTRACT

There is provided an information display device making it possible to improve the reliability of a display against an external force. The information display device includes a case portion for displaying time information in a predetermined operation mode, and a band portion to be worn on an arm, and includes one piece of thin display inside the case portion and the band portion. Inside the band portion, the thin display, a metal sheet, and a resin sheet are laminated. The present technology can be applied to an information display device, etc., for example.

14 Claims, 8 Drawing Sheets

(51) Int. Cl.
*G04G 21/02* (2010.01)
*G06F 3/14* (2006.01)

(56) References Cited

U.S. PATENT DOCUMENTS

| | | | | |
|---|---|---|---|---|
| 2011/0273077 | A1* | 11/2011 | Chen | H01L 51/5246 313/483 |
| 2015/0189134 | A1* | 7/2015 | Joo | G06F 1/1686 348/373 |
| 2016/0282899 | A1* | 9/2016 | Inagaki | H04B 5/0037 |
| 2017/0003774 | A1* | 1/2017 | Iwata | B32B 27/08 |
| 2018/0001174 | A1* | 1/2018 | Aoshima | A61B 5/1118 |
| 2018/0039303 | A1* | 2/2018 | Hashimoto | G02F 1/16753 |

FOREIGN PATENT DOCUMENTS

| | | |
|---|---|---|
| CN | 105659310 A | 6/2016 |
| JP | 2001-275722 A | 10/2001 |
| JP | 2006-516911 A | 7/2006 |
| JP | 2006-284365 A | 10/2006 |
| JP | 2007-256063 A | 10/2007 |
| JP | 2009-128044 A | 6/2009 |
| WO | WO 2016/035571 A1 | 3/2016 |

\* cited by examiner

INFORMATION DISPLAY DEVICE WITH IMPROVED RELIABILITY AGAINST EXTERNAL FORCE

CROSS REFERENCE TO PRIOR APPLICATION

This application is a National Stage Patent Application of PCT International Patent Application No. PCT/JP2018/014733 (filed on Apr. 6, 2018) under 35 U.S.C. § 371, which claims priority to Japanese Patent Application No. 2017-084576 (filed on Apr. 21, 2017), which are all hereby incorporated by reference in their entirety.

TECHNICAL FIELD

The present technology relates to an information display device, and in particular, to an information display device configured so as to be capable of improving the reliability of a display against an external force.

BACKGROUND ART

The applicant of the present application has previously proposed a wristwatch-type information display device in which a thin display that is formed in an extremely-thin film shape and has excellent flexibility is used in a time information presentation portion and a band portion (see Patent Document 1, for example).

CITATION LIST

Patent Document

Patent Document 1: International Publication No. 2016/035571

SUMMARY OF THE INVENTION

Problems to be Solved by the Invention

In the previously-proposed information display device, there is a concern that, in a case where the thin display is provided with high definition and provided with fine circuit wiring, a display control circuit may be damaged and display failure may occur when a certain external force, such as the shock of dropping, is applied.

The present technology has been made in view of such a situation, and enables improving the reliability of a display against an external force.

Solutions to Problems

An information display device according to one aspect of the present technology includes: a time information presentation portion configured to display time information in a predetermined operation mode; and a band portion to be worn on an arm, in which the information display device includes one piece of thin display inside the time information presentation portion and the band portion, and the thin display, a metal sheet, and a resin sheet are laminated inside the band portion.

In one aspect of the present technology, one piece of thin display is provided inside a time information presentation portion configured to display time information in a predetermined operation mode and a band portion to be worn on an arm, and the thin display, a metal sheet, and a resin sheet are laminated and arranged inside the band portion.

The information display device may be an independent device or may be an internal block included in one device.

Effects of the Invention

According to one aspect of the present technology, the reliability of a display against an external force can be improved.

Note that the present technology is not necessarily limited to having the effect described here, and may have any effect described in the present disclosure.

MODE FOR CARRYING OUT THE INVENTION

In the following, a mode for carrying out the present technology (referred to in the following as an embodiment) will be described. Note that description will be provided in the following order.

1. Example Configuration of External Appearance of Information Display Device
2. Examples of Design Patterns of Display Unit
3. Cross-sectional View of Band Portion
4. Connection Portion between Band Portion and Case Portion
5. Display Control Block Diagram
6. Display Updating Processing
7. Other Examples of Information Displayed <1. Example Configuration of External Appearance of Information Display Device>

Figure 1:
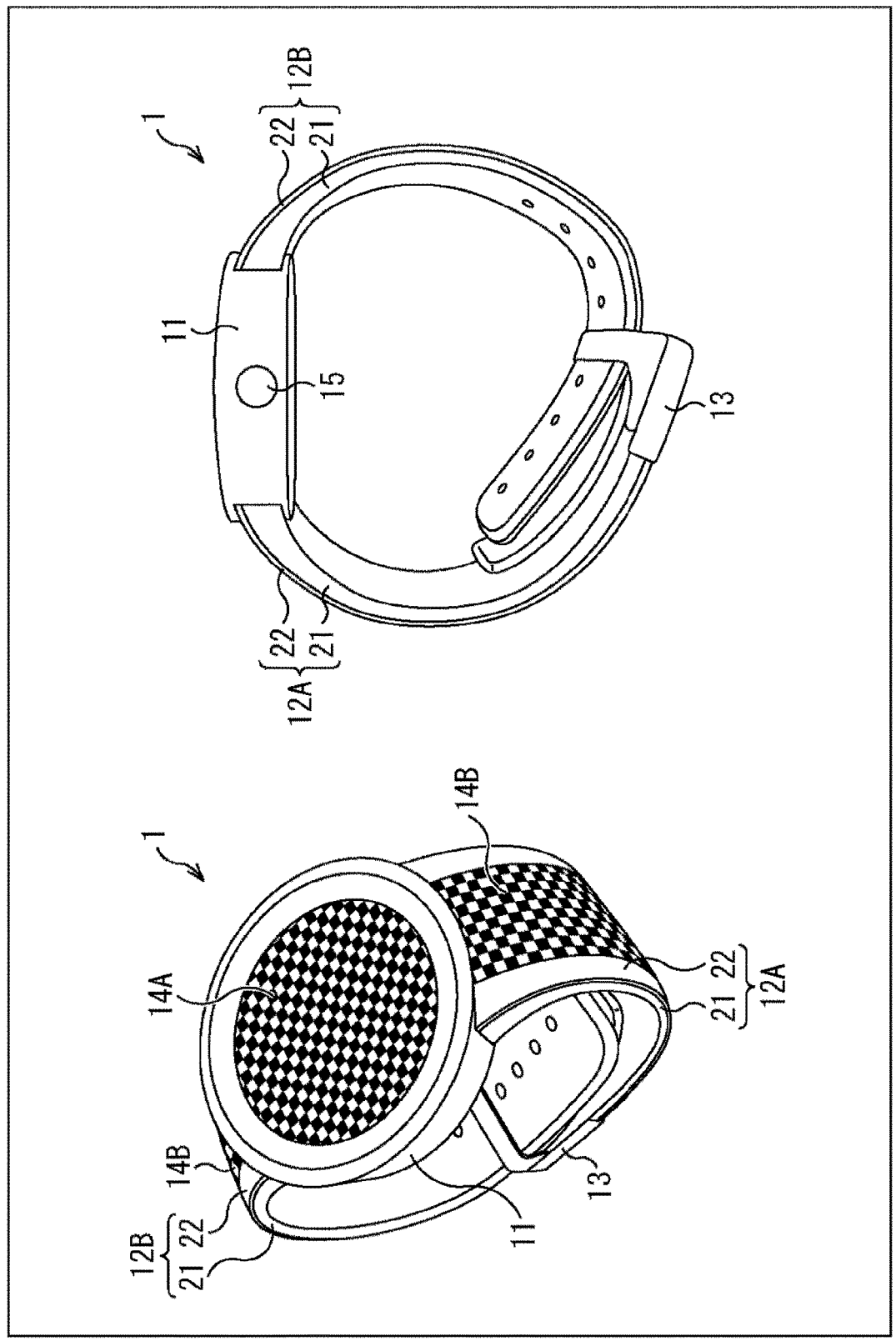
FIG. 1 is a diagram illustrating a configuration example of an external appearance of one embodiment of an information display device to which the present technology is applied.

FIG. 1 shows a perspective view and a side view illustrating an example configuration of the external appearance of one embodiment of an information display device to which the present technology is applied.

The information display device 1 is a wearable device that has a wristwatch-type external shape for being worn on an arm (wrist) and used, and that is capable of displaying at least time information.

The information display device 1 includes a case portion 11, which is a time information presentation portion for displaying time information in a predetermined operation mode, and a band portion 12 to be worn on an arm. The band portion 12 includes a root-side band portion 12A and a sword-tip-side band portion 12B, which are simply referred to as the band portion 12 in a case where it is not necessary to make a distinction therebetween. The root-side band portion 12A and the sword-tip-side band portion 12B are connected by a buckle 13.

The case portion 11 includes a display portion 14A, and the band portion 12 also includes a display portion 14B. The display portions 14A and 14B include one piece of sheet-shaped thin display, and, in the present embodiment, the thin display is an electrophoretic display, which is also referred to as an electronic paper or EPD, for example. The entirety of the display area including the display portions 14A and 14B is referred to as a display unit 14.

The upper surface of the display portion 14A of the case portion 11 is covered with an unillustrated glass cover, and a push button 15 serving as an operation portion is provided on a lateral surface of the case portion 11.

The band portion 12 includes a base portion 21 on the bottom surface side that contacts an arm, and a cover portion 22 on the display surface side of the display portion 14B.

The case portion 11 is a rigid body formed by using a metal material such as stainless steel, for example. The base portion 21 of the band portion 12 is an elastic body formed by using an elastomer material including rubber or a thermoplastic elastomer (TPE), for example. The cover portion 22 is an elastic body formed by using silicon or the like, for example.

The base portion 21 has an appropriate elasticity for absorbing the shock of dropping, etc., by an elastomer material having high hardness and an elastomer material having low hardness being compounded at a predetermined compounding ratio. As the elastomer materials, thermoplastic polyurethane can be used, for example, and the elastomer material having low hardness is compounded as a damping agent or a shock-resistance agent at a predetermined compounding ratio so that a loss coefficient tan δ of 0.5 or more is achieved. As the elastomer material having low hardness, carbonate-based thermoplastic polyurethane can be used, for example, and in this case, the compounding ratio can be set to 20% or less, for example.

The display unit 14, which includes one piece of sheet-shaped electrophoretic display, displays a predetermined design pattern, in the form of an image, by active-matrix driving in which segments that are regularly arranged in a matrix are individually controlled on and off with thin film transistors (TFTs).

<2. Examples of Design Patterns of Display Unit>

Figure 2:
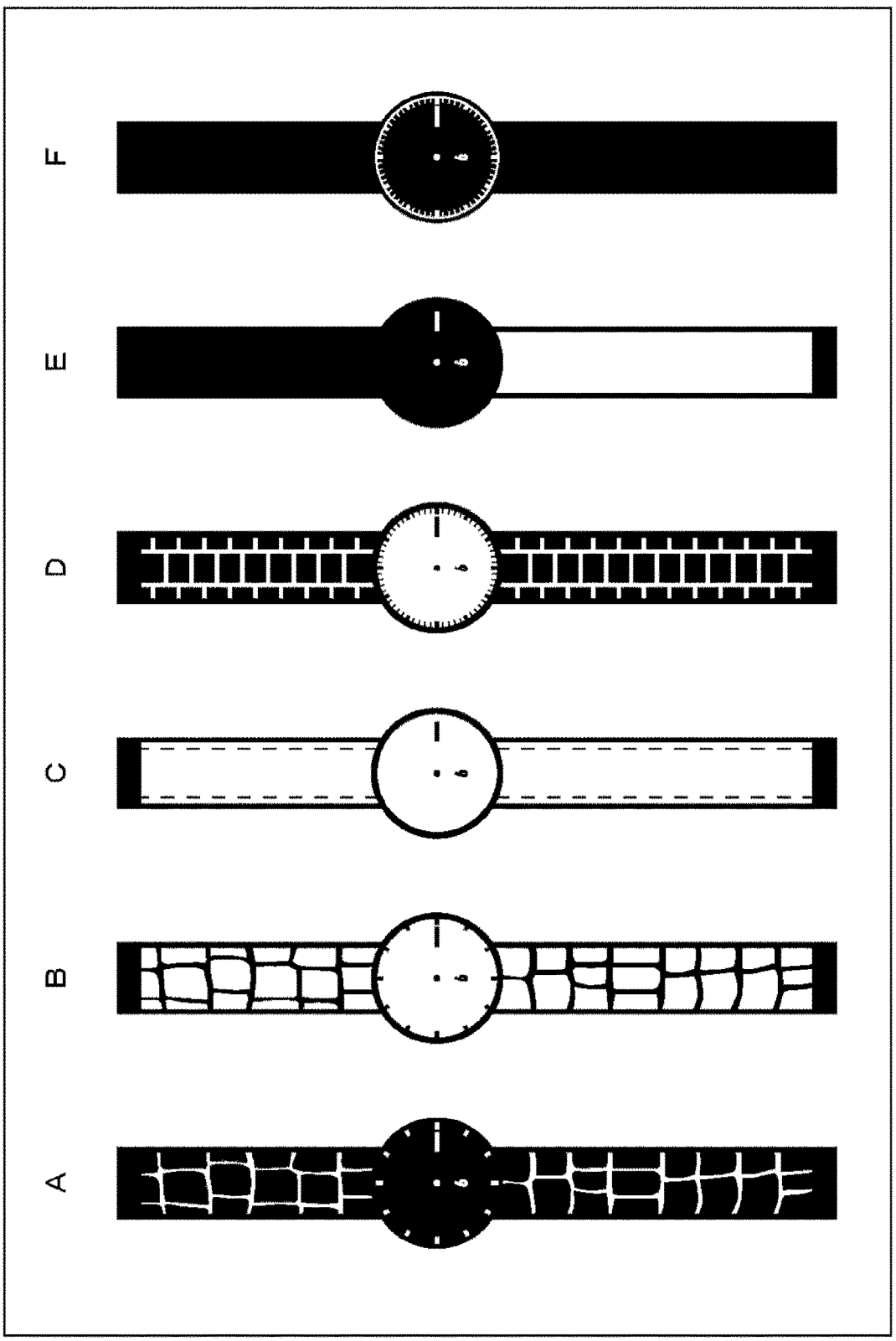
FIG. 2 is a diagram illustrating, as examples, six types of design patterns that can be displayed by a display unit.

FIG. 2 illustrates, as examples, six types of design patterns that can be displayed by the display unit 14 by active-matrix driving.

In FIG. 2, the numeral "6" displayed on the board surface of the case portion 11 represents the hour (6 o'clock), and the hand displayed near the 3 o'clock-direction mark represents the minute hand. Therefore, the time indicated by each display pattern illustrated in FIG. 2 is 6:15. A design pattern having a patterned design is being displayed in the form of an image on the band portion 12.

Note that reference signs are omitted in FIG. 2. Furthermore, in FIG. 2, examples are illustrated in a case where the color of the outer edge parts of the case portion 11 and the band portion 12 is black.

A and B of FIG. 2 are examples of display patterns where the band portion 12 has a crocodile leather-like design.

C of FIG. 2 is an example of a display pattern where the band portion 12 has a design imitating a stitched leather band.

D of FIG. 2 is an example of a display pattern where the band portion 12 has a design imitating a metal bracelet.

E and F of FIG. 2 are examples of display patterns where the band portion 12 has a design imitating a plain leather band.

The display patterns shown in A to F of FIG. 2 are mere examples, and various display patterns can be displayed by active-matrix driving.

<3. Cross-Sectional View of Band Portion>

Figure 3:
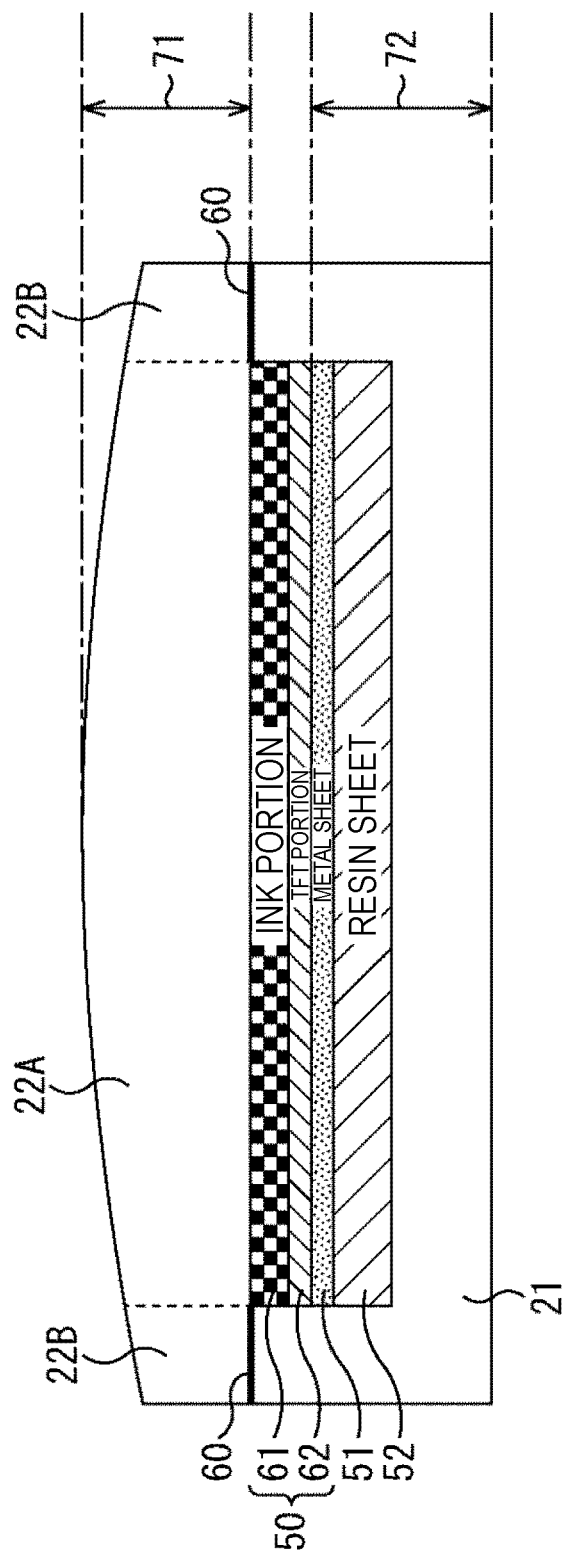
FIG. 3 is a cross-sectional view taken in a direction perpendicular to the longitudinal direction of a band portion.

FIG. 3 is a cross-sectional view taken in a direction perpendicular to the longitudinal direction of the band portion 12.

As already described with reference to FIG. 1, the band portion 12 includes the bottom surface-side base portion 21 and the display surface-side cover portion 22.

A thin display 50, a metal sheet 51, and a resin sheet 52 are laminated and arranged inside a space surrounded by the base portion 21, which has a recessed shape (U-shape), and the cover portion 22 at the upper surface. The base portion 21 covers the lateral surfaces and the bottom surface of the laminate of the thin display 50, the metal sheet 51, and the resin sheet 52, and the cover portion 22 covers the upper surface, which is the display surface of the thin display 50. The upper surface of the base portion 21, which covers the lateral surfaces of the laminate of the thin display 50, the metal sheet 51, and the resin sheet 52, and the bottom surface of the cover portion 22 are bonded with an adhesive sheet 60. With this configuration, the entry of moisture is prevented and moisture resistance is improved, and the design is also improved.

The cover portion 22, which is formed by using silicon or the like, has a configuration such that the color of the cover portion 22 differs between a display area 22A corresponding to the thin display 50 and a bezel area (outer-edge area) 22B. The display area 22A is configured to be transparent so that contents displayed on the thin display 50 can be seen, whereas the color of the bezel area 22B is configured to be the same as the color of the base portion 21.

As described above, an electrophoretic display is adopted as the thin display 50. The thin display 50, which is an electrophoretic display, is configured to have a structure in which an ink portion 61 and a TFT portion (wiring circuit layer) 62 are laminated. The ink portion 61 is a microcapsule layer filled with microcapsules including one or a plurality of types of particles such as white particles and black particles. TFTs that drive the ink portion 61 in units of segments are arranged in a matrix in the TFT portion 62.

The metal sheet 51 beneath the thin display 50 is formed by using stainless steel 304 (SUS 304) or the like, for example. The material of the metal sheet 51 may also be aluminum, copper, titanium, or the like. The resin sheet 52 beneath the metal sheet 51 is formed by using polyethylene terephthalate (PET), for example. The material of the resin sheet 52 may also be a polycarbonate, polypropylene, or the like.

The TFT portion 62 and the metal sheet 51 are bonded together with an adhesive sheet, and the metal sheet 51 and the resin sheet 52 are also bonded together with an adhesive sheet.

As described above, by bonding the extremely thin metal sheet 51 directly beneath the thin display 50, the frequency of occurrence of the disconnection of the wiring pattern and the destruction of the TFTs of the TFT portion 62, caused by the thin display 50 being stretched and distorted when the band portion 12 is bent, can be reduced. The metal sheet 51 preferably has a thickness within the range of 0.03 to 0.08 mm, and in the present embodiment, the metal sheet 51 has a thickness of 0.05 mm, for example.

Furthermore, by bonding the resin sheet 52 directly beneath the metal sheet 51, the shock applied to the thin display 50 upon dropping, etc., can be absorbed.

Furthermore, the resin sheet 52 also achieves the function of finely adjusting the total thickness at low cost. The resin sheet 52 preferably has a thickness within the range of 0.05 to 0.20 mm, and in the present embodiment, the resin sheet 52 has a thickness of 0.125 mm, for example. The ink portion 61 has a thickness of about 0.05 to 0.20 mm, for example, and the TFT portion 62 has a thickness of about 0.02 to 0.15 mm.

Figure 4:
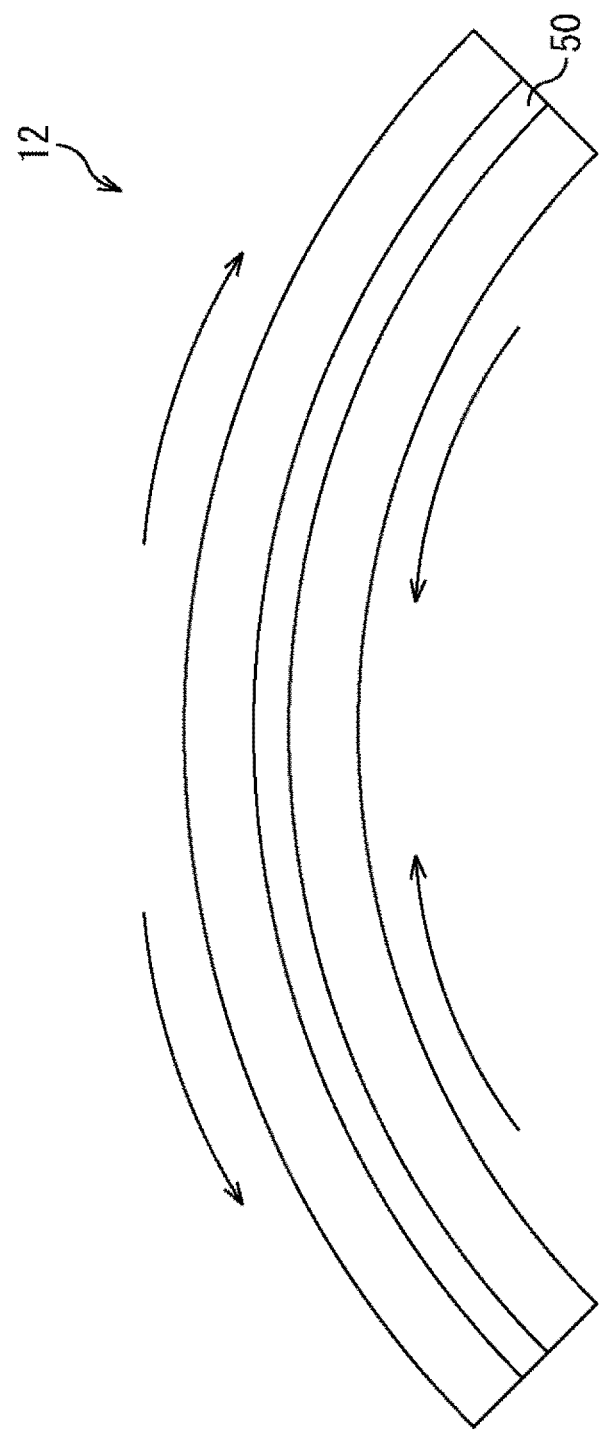
FIG. 4 is a diagram for describing a neutral point of the band portion.

Moreover, as shown in FIG. 3, the band portion 12, as a whole, is formed so that an upper layer-side thickness 71 and a low layer-side thickness 72 are substantially the same, and the thin display 50 is arranged to become a neutral point (neutral plane) of the band portion 12 that is free from both the compressive stress generated at the arm side (bottom surface side) that is worn and the tensile stress generated at the outer side (upper surface side) when the band portion 12 is bent, as illustrated in FIG. 4. Accordingly, the strain generated when the band portion 12 is bent can be minimized, and the resistance against the disconnection of the wiring pattern and the destruction of the TFTs of the TFT portion 62 can be increased.

<4. Connection Portion Between Band Portion and Case Portion>

Figure 5:
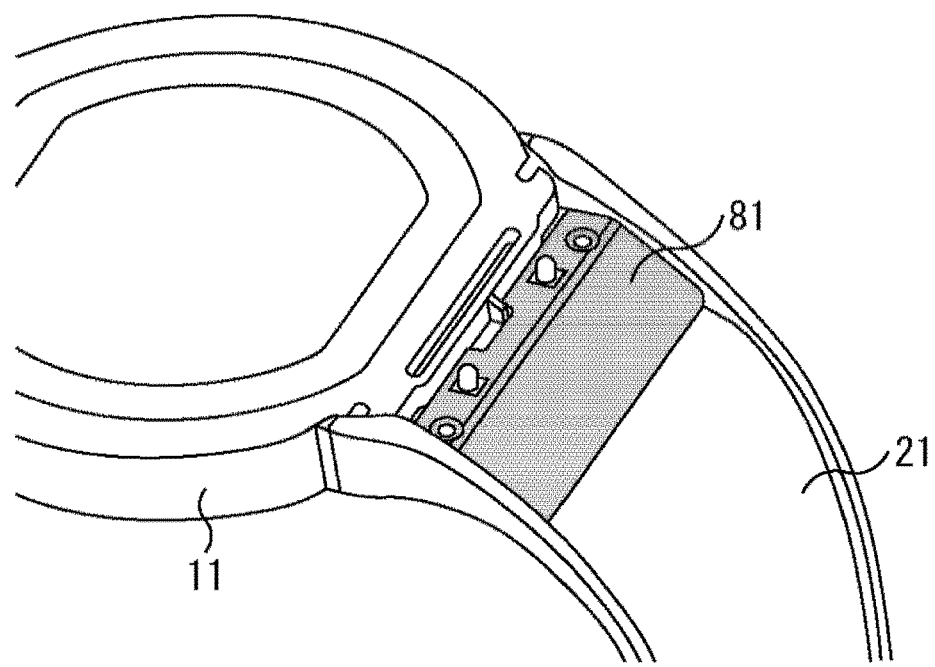
FIG. 5 is an exploded perspective view of a connection portion between the band portion and a case portion.

FIG. 5 is an exploded perspective view of a connection portion between the case portion 11 and the base portion 21, which is a part of the band portion 12.

The base portion 21 of the band portion 12 is connected to the case portion 11, and a metal reinforcement plate 81 is disposed on the base portion 21 adjacent to the connection portion. The laminate structure of the thin display 50, the metal sheet 51, and the resin sheet 52, which is illustrated in FIG. 3, is disposed on this reinforcement plate 81.

Figure 6:
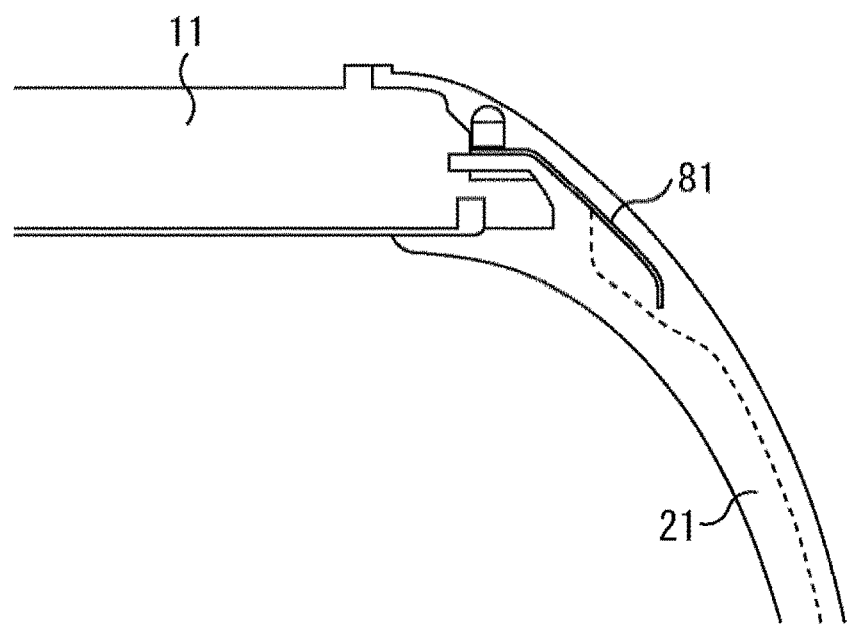
FIG. 6 is a side view of the connection portion between the band portion and the case portion.

FIG. 6 is a side view of the case portion 11, the base portion 21, and the reinforcement plate 81.

After the resin sheet 52, the metal sheet 51, and the thin display 50 are arranged on the base portion 21 and the reinforcement plate 81 in the order of lamination shown in FIG. 3, the cover portion 22 is arranged and the resin sheet 52, the metal sheet 51, and the thin display 50 are covered.

For example, in a case where the band portion 12 is bent largely such as a case where the information display device 1 is dropped, large stress tends to be intensively applied to a portion near the case portion 11 at which the band portion 12 is fixed. By the metal reinforcement plate 81 being arranged near the connection portion between the band portion 12 and the case portion 11, bending of the band portion 12 can be suppressed to be within a predetermined range even in a case where large stress is applied in the vicinity of the connection portion between the band portion 12 and the case portion 11, and the frequency of occurrence of the disconnection of the wiring pattern and the destruction of the TFTs of the TFT portion 62 can be reduced.

As described above, according to the information display device 1 to which the present technology is applied, the frequency of occurrence of the disconnection of the wiring pattern and the destruction of the TFTs of the TFT portion 62, caused by the thin display 50 being stretched and distorted, can be reduced by the thin display 50, the metal sheet 51, and the resin sheet 52 being laminated and arranged inside the space surrounded by the base portion 21 and the cover portion 22.

Furthermore, by the metal reinforcement plate 81 being arranged near the connection portion between the band portion 12 and the case portion 11, bending of the band portion 12 at a portion near the case portion 11 in a case where the band portion 12 is largely bent can be suppressed to be within a predetermined range, and the frequency of occurrence of the disconnection of the wiring pattern and the destruction of the TFTs of the TFT portion 62 can be reduced.

Moreover, by compounding an elastomer material having high hardness and an elastomer material having low hardness at a predetermined compounding ratio, the base portion 21 can be provided with an appropriate elasticity and the shock of dropping, etc., can be absorbed.

With this configuration, the reliability of the display against an external force can be improved in the information display device 1.

<5. Display Control Block Diagram>

Figure 7:
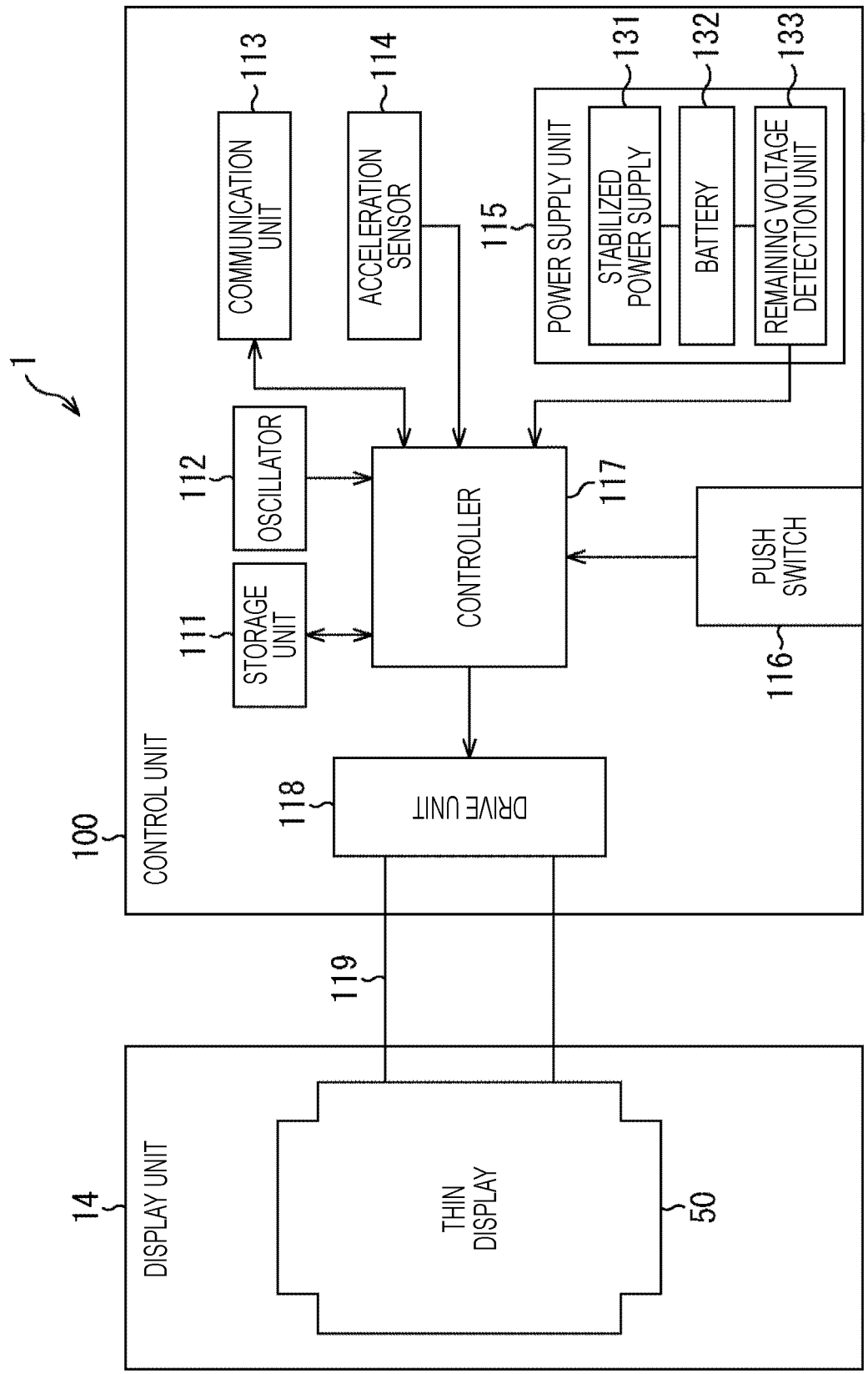
FIG. 7 is a control block diagram related to display control of the information display device.

FIG. 7 shows a control block diagram related to display control of the information display device 1.

The information display device 1 includes the display unit 14 and a control unit 100 that controls the display unit 14.

The display unit 14 includes the thin display 50, and performs displaying of predetermined contents on the basis of control from the control unit 100. In the present embodiment, the thin display 50 is configured by using an electrophoretic display, which is also referred to as electronic paper or EPD.

Note that in a case where electronic paper is adopted as the thin display 50, the system that the electronic paper adopts to perform displaying need not be limited to the above-described microcapsule system, and systems other than the electrophoresis-type system may be used.

Furthermore, other extremely-thin displays having flexibility, such as an organic electro luminescence (EL) display or a liquid crystal display, may be adopted as the thin display 50, for example.

The control unit 100 includes a storage unit 111, an oscillator 112, a communication unit 113, an acceleration sensor 114, a power supply unit 115, a push switch 116, a controller 117, and a drive unit 118.

The storage unit 111 is configured by using a non-volatile memory such as an electrically erasable programmable read-only memory (EEPROM), for example, and stores various programs and various types of data necessary for control.

For example, the storage unit 111 stores a program for controlling displaying performed by the thin display 50, a program for time control based on a clock signal from the oscillator 112, a program for communicating with other communication devices via the communication unit 113, a program for operation control based on a sensor signal from the acceleration sensor 114, etc. The program for controlling displaying performed by the display unit 14 also includes a power saving control program for suspending the displaying of time by the display unit 14, etc. The power saving control program is described later with reference to FIG. 8.

The programs and data stored in the storage unit 111 are read by the controller 117 as necessary. Furthermore, the storage unit 111 can be configured to be detachable from the information display device 1. Alternatively, the storage unit 111 may be incorporated as a part of the controller 117.

The oscillator 112 is configured by using a crystal oscillator, a ceramic oscillator, or the like, for example. The oscillator 112 generates a clock signal that serves as a basis of time information and supplies the clock signal to the controller 117.

The communication unit 113 is a communication device that performs wireless communication by near-field communication (NFC), infrared communication, Bluetooth (registered trademark), and the like, for example, with other communication devices such as smartphones. In this case, the communication unit 113 performs wireless communication with another communication device and acquires data provided from the other communication device, and supplies the data to the controller 117.

Furthermore, the communication unit 113 may also be a communication device that connects to a network such as the Internet, a local area network (LAN), or a wide area network (WAN). In this case, the communication unit 113 connects with another communication device, such as a server device, via the network and acquires data provided from the other communication device, and supplies the data to the controller 117. In other words, in the present embodiment, the scheme of the wireless communication performed by the communication unit 113 is not limited, and any scheme can be adopted.

For example, the communication unit 113 receives design data corresponding to an image to be displayed by the display unit 14 from another communication device, and supplies the received design data to the controller 117. The controller 117 stores the design data acquired from the communication unit 113 in the storage unit 111.

Accordingly, a user can acquire (download) design data differing from design data stored in advance in the storage unit 111 to the information display device 1 via the communication unit 113. Due to this, the display pattern of the information display device 1 can be changed to a display pattern differing from display patterns prepared in advance.

The acceleration sensor 114 is an inertial sensor that detects acceleration in the three axes of the X axis, the Y axis, and the Z axis, and supplies the detection result to the controller 117. The acceleration sensor 114 detects the movement of the information display device 1.

The power supply unit 115 includes a stabilized power supply 131, a battery 132, and a remaining voltage detection unit 133, and controls the power supply voltage yielded from the battery 132 into a constant voltage by using the stabilized power supply 131, and supplies power to each component in the device that is in need of power supply. The remaining voltage detection unit 133 detects the remaining voltage of the battery 132, and, in a case where the battery capacity of the battery 132 becomes lower than or equal to a predetermined level, supplies a signal indicating the above state to the controller 117. Note that the information display device 1 may be provided with a power supply terminal for receiving power supply from the outside, and the information display device 1 may be provided with a charging function for charging the battery 132.

The push switch 116 detects a user operation on the push button 15 (FIG. 1), and provides the controller 117 with output in the form of an electric signal.

The controller 117 is configured by using a microcomputer, a central processing unit (CPU), or the like, for example, and operates as a display control unit that controls the displaying performed by the thin display 50, on the basis of various programs read from the storage unit 111.

Specifically, the controller 117 supplies the drive unit 118 with a control signal for updating the time information of the thin display 50, on the basis of a clock signal supplied from the oscillator 112, for example. Furthermore, when the information display device 1 enters a predetermined state, the controller 117 supplies the drive unit 118 with a control signal for suspending the updating of displayed contents performed by the thin display 50, on the basis of a detection result from the acceleration sensor 114, for example.

The drive unit 118 is configured by using a drive IC that drives the thin display 50, for example, and drives the thin display 50 on the basis of control signals from the controller 117. The drive unit 118 drives the thin display 50 in accordance with a timing control signal from an unillustrated timing controller. The electrophoretic display, which serves as the thin display 50, has a plurality of segments arranged two-dimensionally in a matrix, and the drive unit 118 controls displaying in units of segments by controlling the TFTs provided in one-to-one correspondence with the segments. The thin display 50 and the drive unit 118 are connected by flexible printed circuits (FPCs) 119, for example.

The information display device 1 configured as described above has a normal mode and a suspend mode as operation modes for causing the display unit 14 to display time information. In the normal mode, the updating of displayed contents is performed in units of minutes each time the time is updated every minute. In the suspend mode, the updating of displayed contents is suspended when it is regarded that the information display device 1 is not being worn by a user.

<6. Display Updating Processing>

Figure 8:
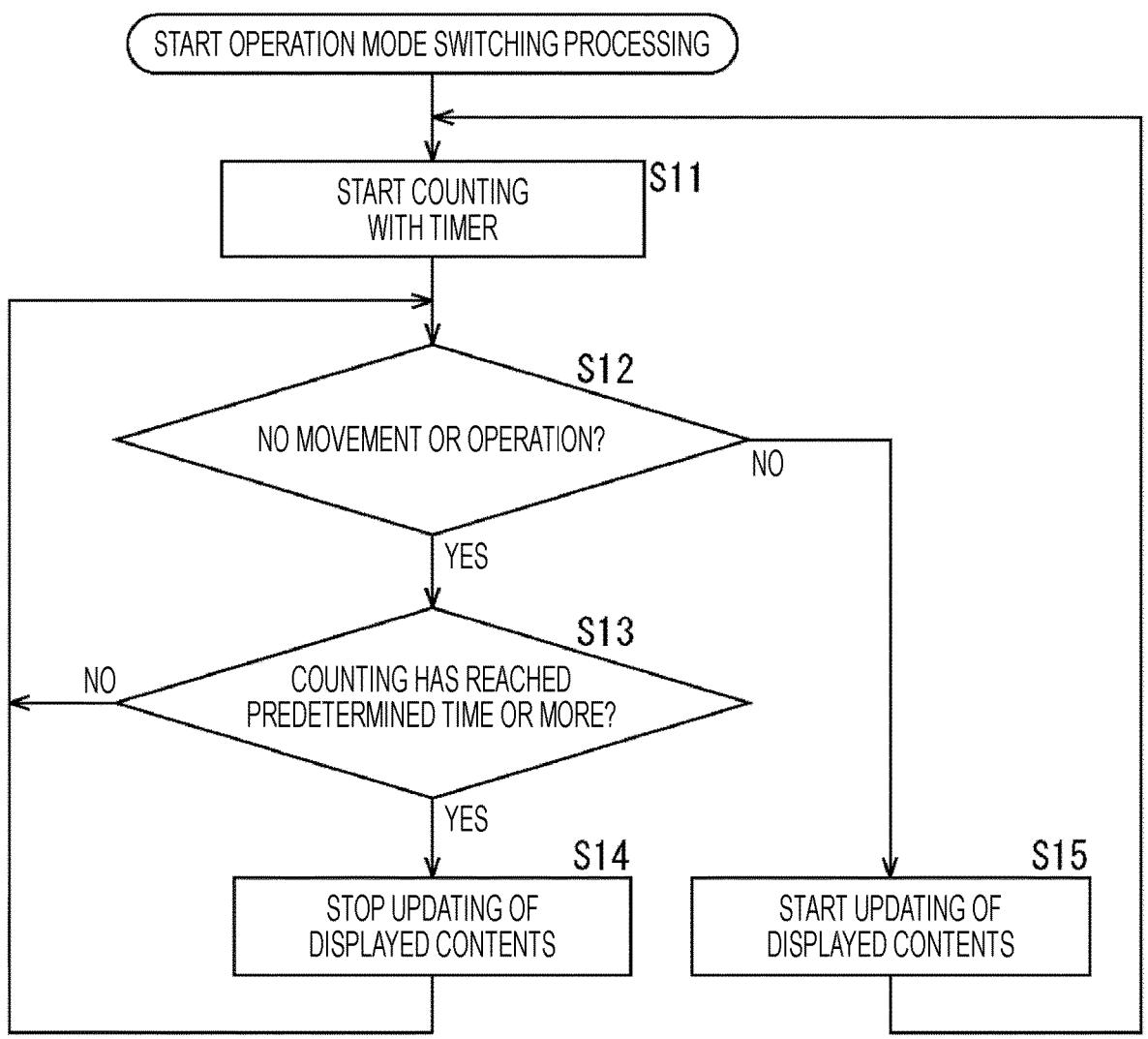
FIG. 8 is a flowchart illustrating operation mode switching processing.

Referring to the flowchart in FIG. 8, the flowchart illustrates operation mode switching processing in which the information display device 1 switches between operation modes, i.e., the normal mode and the suspend mode.

First, in step S11, the controller 117 starts counting with a timer from zero.

In step S12, the controller 117 determines whether there is no movement or operation of the information display device 1, on the basis of the sensor detection result supplied from the acceleration sensor 114 and the detection result from the push switch 116. In other words, in a case where a user is wearing and using the information display device 1, a sensor signal from the acceleration sensor 114 is detected in response to the movement of an arm, or a detection signal from the push switch 116 is supplied to the controller 117 in response to an operation performed on the push button 15 (FIG. 1). Conversely, from a state in which such signals are not supplied to the controller 117 for a certain period or more, it can be estimated that the information display device 1 is left somewhere and is not being used by a user.

In a case where it is determined in step S12 that there is no movement or operation of the information display device 1, the processing proceeds to step S13, where the controller 117 determines whether the counting with the timer has reached a predetermined time or more.

In a case where it is determined in step S13 that the counting with the timer has not reached the predetermined time or more (is less than the predetermined time), the processing returns to step S12.

On the other hand, in a case where it is determined in step S13 that the counting with the timer has reached the predetermined time or more, that is, in a case where a state in which the information display device 1 is not being used by a user is estimated, the processing proceeds to step S14, where the controller 117 sets the operation mode to the suspend mode and the updating of displayed contents, in which time information is updated each time time is updated in units of minutes, is stopped. In a case where the suspend mode is already set as the operation mode, the suspend mode is continued. After step S14, the processing returns to step S12.

On the other hand, in a case where it is determined in step S12 that there is a movement or operation of the information display device 1, the processing proceeds to step S15, where the controller 117 sets the operation mode to the normal mode and the updating of displayed contents, in which time information is updated each time time is updated in units of minutes, is started. In a case where the normal mode is already set as the operation mode, the normal mode is continued. After step S15, the processing returns to step S11.

As described above, the controller 117 estimates whether or not the information display device 1 is being used by a user on the basis of the detection results from the acceleration sensor 114 and the push switch 116, and in a state where it is estimated that the information display device 1 is not being used by a user, the controller 117 does not perform the updating of displayed contents. Generally, the lifetime of an electronic paper is dependent upon the number of times updating of displayed contents is performed (the number of times rendering is performed), and thus, the lifetime of the information display device 1 can be extended by suppressing the updating of displayed contents.

<7. Other Examples of Information Displayed>

In the above-described embodiment, the information display device 1 displays time information on the display portion 14A in the case portion 11, and displays pattern information of a pattern of a watch band on the display portion 14B of the band portion 12.

However, since the active-matrix-driven thin display 50 is adopted in the display unit 14, information other than the time information and the pattern information can be displayed in a desired area.

Figure 9:
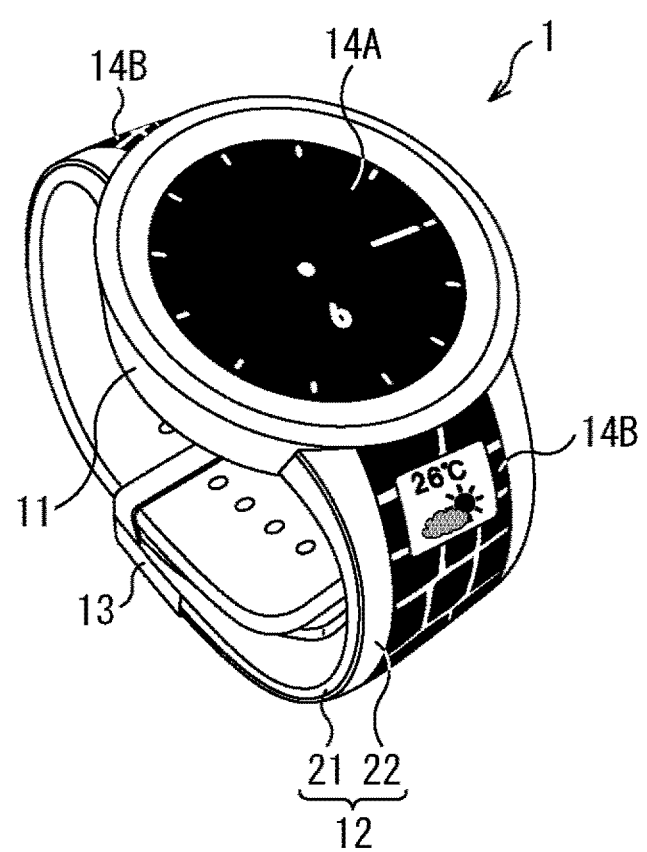
FIG. 9 is a diagram illustrating an example of an information display device displaying predetermined information on a display unit.

For example, the display unit 14 may be made to display information such as the date and the day of the week, which are commonly displayed on wristwatches, or to display the current temperature, weather information, and the like, as illustrated in FIG. 9. Predetermined information that the display unit 14 is made to display can be acquired by connection with a predetermined server via the communication unit 113.

As described above, the display unit 14 of the information display device 1 can present a wide variety of information to a user.

Embodiments of the present technology are not limited to the above-described embodiment, and various modifications can be made without departing from the scope of the present technology.

For example, a form can be adopted in which parts of the above-described embodiment are combined as appropriate.

The present technology can adopt a cloud computing configuration in which one function is shared and processed by a plurality of devices in cooperation with one another via a network.

Furthermore, each step described in the above-described flowchart can be executed by one device, and can also be shared and executed by a plurality of devices.

Moreover, in a case where a plurality of processes is included in one step, the plurality of processes included in the step can be executed by one device and also can be shared and executed by a plurality of devices.

Note that the effects described in the present description are mere examples. The effects of the present technology are not limited to those, and the present technology may have effects other than those described in the present description.

Note that the following configurations may also be adopted in the present technology.

(1)

An information display device including: a time information presentation portion configured to display time information in a predetermined operation mode; and a band portion to be worn on an arm, in which the information display device includes one piece of thin display inside the time information presentation portion and the band portion, and the thin display, a metal sheet, and a resin sheet are laminated and arranged inside the band portion.

(2)

The information display device according to (1) described above, in which a material of the metal sheet is stainless steel.

(3)

The information display device according to (1) or (2) described above, in which the metal sheet has a thickness within a range of 0.03 to 0.08 mm.

(4)

The information display device according to any one of (1) or (3) described above, in which a material of the resin sheet is polyethylene terephthalate.

(5)

The information display device according to any one of (1) to (4) described above, in which the resin sheet has a thickness within a range of 0.05 to 0.20 mm.

(6)

The information display device according to any one of (1) to (5) described above, in which the band portion includes a base portion and a cover portion, the base portion covers lateral surfaces and a bottom surface of the laminate of the thin display, the metal sheet, and the resin sheet, the cover portion covers an upper surface of the thin display, the upper surface being a display surface, and an upper surface of the base portion covering the lateral surfaces of the laminate of the thin display, the metal sheet, and the resin sheet and a bottom surface of the cover portion are bonded.

(7)

The information display device according to any one of (1) to (6) described above, in which a material of the base portion is a material in which an elastomer material having high hardness and an elastomer material having low hardness are compounded at a predetermined compounding ratio.

(8)

The information display device according to any one of (1) to (7) described above, in which the elastomer materials are thermoplastic polyurethane.

(9)

The information display device according to any one of (1) to (8) described above, in which the thin display is arranged at a neutral point of the band portion.

(10)

The information display device according to any one of (1) to (9) described above, in which the band portion includes a metal reinforcement plate near a connection portion with the time information presentation portion.

(11)

The information display device according to any one of (1) to (10) described above, further including:

a detection unit for detecting a movement of the information display device; and a display control unit for controlling displaying by the thin display, in which the display control unit stops updating contents displayed by the thin display in a case where a movement of the information display device is not detected for a predetermined period or more.

(12)

The information display device according to any one of (1) to (11) described above, in which the thin display is electronic paper.

(13)

The information display device according to any one of (1) to (11) described above, in which the thin display is an organic EL display.

(14)

The information display device according to any one of (1) to (11) described above, in which the thin display is a liquid crystal display.

REFERENCE SIGNS LIST

1 Information display device
11 Case portion
12(12A, 12B) Band portion
13 Buckle
14(14A, 14B) Display unit
21 Base portion
22 Cover portion
50 Thin display
51 Metal sheet
52 Resin sheet
61 Ink portion
62 TFT portion
81 Reinforcement plate
114 Acceleration sensor
117 Controller
118 Drive unit

The invention claimed is:

1. An information display device comprising:
a time information presentation portion configured to display time information in a predetermined operation mode; and
a band portion configured to be worn on an arm,
wherein the information display device includes one piece of thin display inside the time information presentation portion and the band portion,
wherein the thin display includes an ink portion layered on a thin film transistor portion,
wherein the thin display, a metal sheet, and a resin sheet are laminated between a base portion and a cover portion of the band portion, and
wherein the band portion is formed with a thickness of the base portion extending below the resin sheet being equal to a thickness of the cover portion of the band portion extending above the thin display.

2. The information display device according to claim 1, wherein a material of the metal sheet is stainless steel.

3. The information display device according to claim 1, wherein the metal sheet has a thickness within a range of 0.03 to 0.08 mm.

4. The information display device according to claim 1, wherein a material of the resin sheet is polyethylene terephthalate.

5. The information display device according to claim 1, wherein the resin sheet has a thickness within a range of 0.05 to 0.20 mm.

6. The information display device according to claim 1, wherein the base portion covers lateral surfaces and a bottom surface of the laminate of the thin display, the metal sheet, and the resin sheet,
wherein the cover portion covers an upper surface of the thin display, the upper surface being a display surface, and
wherein an upper surface of the base portion covering the lateral surfaces of the laminate of the thin display, the metal sheet, and the resin sheet and a bottom surface of the cover portion are bonded.

7. The information display device according to claim 1, wherein a material of the base portion is a material in which an elastomer material having high hardness and an elastomer material having low hardness are compounded at a predetermined compounding ratio.

8. The information display device according to claim 7, wherein the elastomer materials are thermoplastic polyurethane.

9. The information display device according to claim 1, wherein the thin display is arranged at a stress neutral point of the band portion.

10. The information display device according to claim 1, wherein
the band portion includes a metal reinforcement plate near a connection portion with the time information presentation portion.

11. The information display device according to claim 1, further comprising:
a detection unit for detecting a movement of the information display device; and
a display control unit for controlling displaying by the thin display,
wherein the display control unit stops updating contents displayed by the thin display in a case where a movement of the information display device is not detected for a predetermined period or more, and
wherein the detection unit and the display control unit are each implemented via at least one processor.

12. The information display device according to claim 1, wherein the thin display is electronic paper.

13. The information display device according to claim 1, wherein the thin display is an organic electroluminescent display.

14. The information display device according to claim 1, wherein the thin display is a liquid crystal display.

* * * * *